(12) United States Patent
Benett et al.

(10) Patent No.: US 6,746,503 B1
(45) Date of Patent: Jun. 8, 2004

(54) PRECISION GAP PARTICLE SEPARATOR

(75) Inventors: William J. Benett, Livermore, CA (US); Robin Miles, Danville, CA (US); Leslie M. Jones, II, Rio Vista, CA (US); Cheryl Stockton, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 3 days.

(21) Appl. No.: 10/355,785

(22) Filed: Jan. 30, 2003

(51) Int. Cl.[7] ............................................... B01D 45/04
(52) U.S. Cl. ...................... 55/434; 55/462; 55/DIG. 5; 95/31; 95/267; 156/345.1; 156/345.19; 209/143; 264/259; 264/DIG. 48
(58) Field of Search ........................... 55/434, 462–465, 55/DIG. 5; 95/31, 32, 267; 209/143; 264/259, DIG. 48; 210/433.1, 434, 446; 156/345.1, 345.11, 345.12, 345.19; 96/392, 393

(56) References Cited

U.S. PATENT DOCUMENTS

| | | | | |
|---|---|---|---|---|
| 3,668,080 A | * | 6/1972 | Weber et al. .................. 205/73 |
| 3,748,826 A | * | 7/1973 | Marchal et al. ................ 95/32 |
| 3,835,918 A | * | 9/1974 | Pilarczyk ..................... 165/47 |
| 3,853,528 A | * | 12/1974 | Wodrich et al. .............. 55/434 |
| 4,033,021 A | * | 7/1977 | Tybus et al. ........... 29/890.142 |
| 5,040,424 A | | 8/1991 | Marple et al. ........... 73/863.23 |
| 5,183,481 A | | 2/1993 | Felder ............................ 95/29 |
| 5,425,802 A | | 6/1995 | Burton et al. .................. 95/32 |
| 5,534,328 A | * | 7/1996 | Ashmead et al. ........... 428/166 |
| 5,690,763 A | * | 11/1997 | Ashmead et al. ............. 156/60 |
| 6,010,554 A | * | 1/2000 | Birmingham et al. .......... 95/32 |
| 6,062,392 A | * | 5/2000 | Birmingham et al. ....... 209/143 |
| 6,290,065 B1 | * | 9/2001 | Kenning et al. ............ 209/143 |
| 6,402,817 B1 | * | 6/2002 | Bergman ..................... 95/267 |
| 2002/0157993 A1 | * | 10/2002 | Call et al. ................... 209/143 |

FOREIGN PATENT DOCUMENTS

DE 3446089 * 8/1986 .................. 55/434

* cited by examiner

*Primary Examiner*—Richard L. Chiesa
(74) *Attorney, Agent, or Firm*—Eddie E. Scott; Alan H. Thompson

(57) ABSTRACT

A system for separating particles entrained in a fluid includes a base with a first channel and a second channel. A precision gap connects the first channel and the second channel. The precision gap is of a size that allows small particles to pass from the first channel into the second channel and prevents large particles from the first channel into the second channel. A cover is positioned over the base unit, the first channel, the precision gap, and the second channel. An port directs the fluid containing the entrained particles into the first channel. An output port directs the large particles out of the first channel. A port connected to the second channel directs the small particles out of the second channel.

14 Claims, 2 Drawing Sheets

PRECISION GAP PARTICLE SEPARATOR

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to separators and more particularly to a precision gap particle separator.

2. State of Technology

U.S. Pat. No. 5,425,802 to Robert M. Burton, et al. assigned to The United States of America as represented by the Administrator of Environmental Protection Agency and President and Fellows of Harvard, patented Jun. 20, 1995, provides background information regarding a virtual impactor for removing particles from an airstream. The virtual impactor comprises nozzle means for accelerating an entering airstream, particle receiving means positioned downstream from the nozzle means, and a chamber in fluid communication with the gap between the nozzle means and the receiving means. The nozzle means comprises an inlet and an elongated outlet having a width dimension of between about 0.007 and 0.010 inches, and further having a longitudinal axis normal to and passing through the center of the elongated outlet. The particle receiving means comprises an elongated inlet having a width dimension of between about 0.013 and 0.015 inches and an outlet and further has a longitudinal axis normal to and passing through the center of the elongated inlet. The particle receiving means is positioned downstream from the outlet of the nozzle means so that the flow gap therebetween is between about 0.008 and 0.012 inches, and is further positioned so that the longitudinal axis of the nozzle means and the longitudinal axis of the receiving means are substantially coaxial and so that the width dimension of the nozzle means outlet and the width dimension of the receiving means inlet are substantially parallel. The chamber is configured to be in fluid communication with a vacuum source, as is the outlet of the particle receiving means.

U.S. Pat. No. 5,040,424 to Virgil A. Maple, et al., assigned to Regents of the University of Minnesota, patented Aug. 20, 1991, provides background information regarding a high-volume aerosol sampling inlet housing which provides smooth inlet flow to a 10 micron classification device in a high volume flow. The high volume sampler with which the inlet is used establishes a high flow, for example, 40 cubic feet per minute. The air flow into the inlet has a standard 40 cubic feet per minute leading to the high volume sampler which requires a secondary inlet flow of about two cubic feet per minute needed for particle classification. The two cubic feet per minute flow is exhausted at a separate outlet and is not connected to the standard high volume sampler. Thus, a total flow of 42 cubic feet per minute enters the inlet. The entrance opening to the inlet is an annular opening below a dome cover. Screens are provided to keep any bugs or large debris from entering the inlet housing. The debris-free air flow is passed through the desired impactor device, and the large particles will be collected with the secondary outlet flow of only two cubic feet per minute while the smaller particles are carried out by the major flow of 40 cfm to the high volume sampler filter placed below. The larger particles are thus inertially separated from the major flow and are flushed by the smaller secondary or minor flow. The major flow through to the high volume sampler is maintained at the standard 40 cubic feet per minute. The particles in the inlet air stream are separated into size classifications larger and smaller than 10 microns. The large particles that are flushed out with the two cubic feet per minute flow can either be removed from the air stream by a second filter, or analyzed in a conventional impactor or some other device, or may be allowed to pass through the air pump and be blown back into the atmosphere.

U.S. Pat. No. 5,183,481 to William Felder, assigned to Aerochem Research Laboratories, Inc., patented Feb. 2, 1993, provides background information regarding a supersonic virtual impactor. A supersonic gas flow is employed with a virtual impactor to separate fine particles completely from the gas. The carrying gas and fine particles are accelerated to supersonic speeds and then impacted against a virtual impactor. When the supersonic stream strikes the virtual impactor, a shock wave forms in the gas stream near the impactor surface. The carrying gas turns sharply away while the particles in the gas stream, carried by their inertia, continue in their original direction and pass into the virtual impactor. On the downstream side of the virtual impactor surface, a non-contaminating inert gas maintains a pressure equal to or greater than the pressure of the carrying gas between the virtual impactor surface and the shock wave.

U.S. Pat. No. 6,402,817 to Warner Bergman, assigned to the Regents of the University of California, patented Jun. 11, 2002, provides background information regarding a low pressure drop, multi-slit virtual impactor. A virtual impactor system is provided for dividing a particle containing gas flow into (a) a small flow component with a small portion of the gas flow that carries particles essentially greater than a predetermined size and (b) a large flow component with a large portion of the gas flow that carries particles essentially less than the predetermined size. The gas can be either air or other gases. The virtual impactor system can also utilize fluids other than gas, for example, liquids. The virtual impactor system includes multiple nozzles for accelerating and channeling the fluid stream and multiple receivers positioned downstream from the nozzles. The nozzles are located so that each receiver has a substantially common axis with a corresponding nozzle. The receivers are separated from the nozzles by gaps. The virtual impactor system also includes multiple exhaust chambers in fluid communication with the gaps between the nozzles and the receivers. The multiple exhaust chambers are sandwiched alternately between the multiple receivers. The nozzles have an elongated outlet, with the nozzle outlet positioned to direct the accelerated fluid flow into the receivers in an approximate straight line.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a method of producing a particle separator for separating particles entrained in a fluid.

Some of the particles are of a small size, smaller than a predetermined size, and some of the particles are of a large size, larger than said predetermined size. A first channel and a second channel are etched in a base. A precision gap is etched in the base connecting the first channel and the second channel. The precision gap is etched to a size that allows the small particles to pass from the first channel into the second channel and prevents the large particles from passing from the first channel into the second channel. A cover is positioned over the base unit, the first channel, the precision gap, and the second channel. An input port is connected to the first channel for directing the fluid containing the entrained particles into the first channel. An output port is connected to the first channel for directing the large particles out of the first channel. A port is connected to the second channel for directing the small particles out of the second channel.

The present invention provides a system for separating particles entrained in a fluid. Some of the particles are of a relative small size, smaller than a predetermined size, and some of the particles are of a relative large size, larger than said predetermined size. The system comprises a base, a first channel in the base, a second channel in the base spaced from and substantially parallel to the first channel, and a precision gap connecting the first channel and the second channel. The precision gap is of a size that allows the small particles to pass from the first channel into the second channel and prevents the large particles from passing from the first channel into the second channel. A cover is positioned over the base, the first channel, the precision gap, and the second channel. An input port connected to the first channel directs the fluid containing the entrained particles into the first channel. An output port connected to the first channel directs the large particles out of the first channel. A port connected to the second channel directs the small particles out of the second channel.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
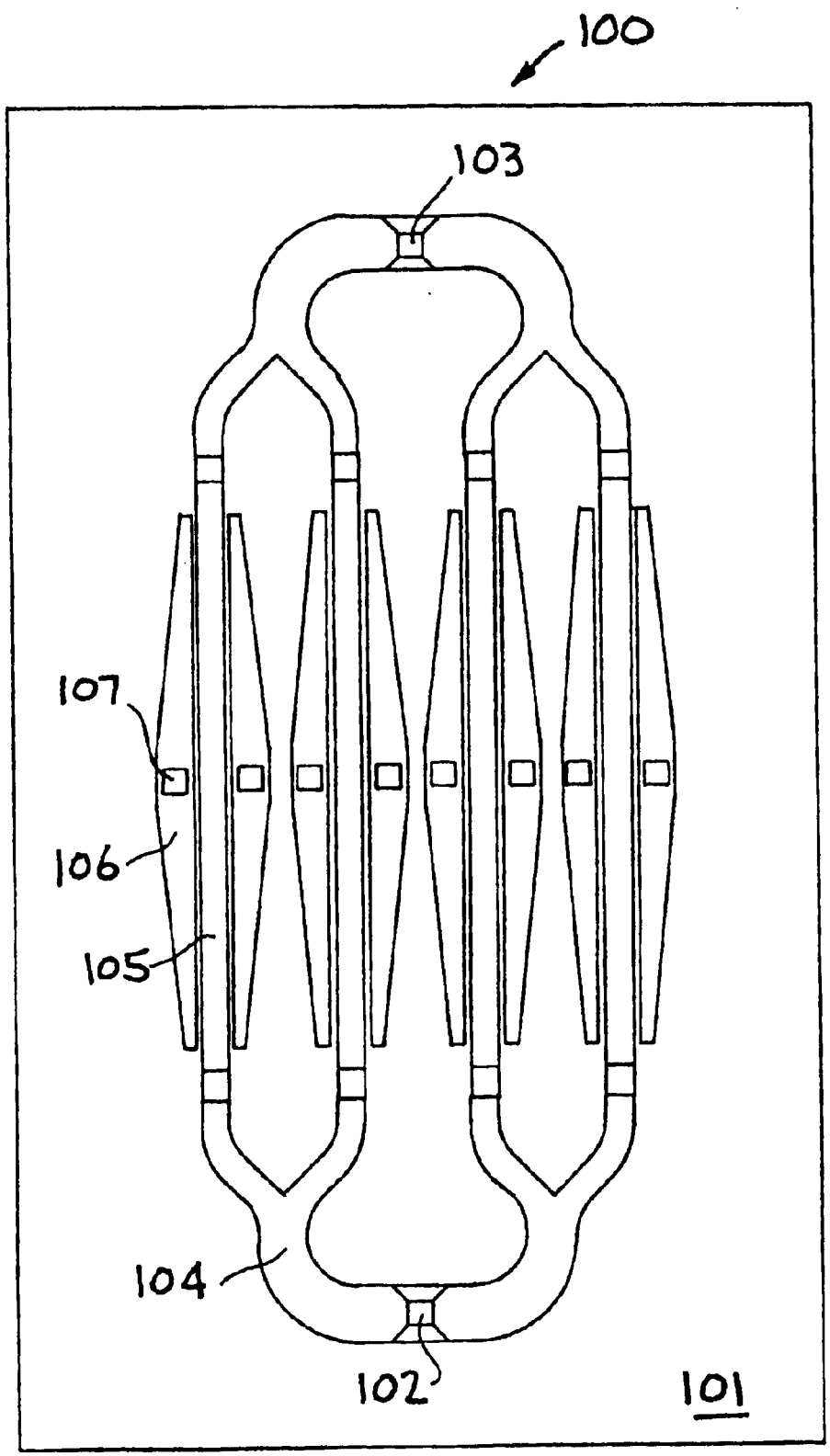
FIG. 1 illustrates one embodiment of a system constructed in accordance with the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

There is an increasing need in microbiology for a system for separating particles by size. A variety of biological procedures and systems use particles or beads of a specific size. It is a common requirement for these particles to be separated from the biological sample as part of a given procedure. The particles in question range in size from less then one $\mu$ meter to tens of $\mu$ meters in diameter. Capturing and then releasing particles this small is an extremely challenging problem. One technique that has been tried is mechanical filtration. While filtering does separate the small particles from the sample, recovering the particles from the filter material is extremely difficult and often impossible.

Referring now to FIG. 1, one embodiment of a particle separator system constructed in accordance with the present invention is illustrated. The system separates particles entrained in a fluid. Some of the particles are of a relative small size, smaller than a predetermined size, and some of the particles are of a relative large size, larger than said predetermined size. The system comprises a base, a first channel in the base, a second channel in the base spaced from and substantially parallel to the first channel, and a precision gap connecting the first channel and the second channel. The precision gap is of a size that allows the small particles to pass from the first channel into the second channel and prevents the large particles from passing from the first channel into the second channel. A cover is positioned over the base, the first channel, the precision gap, and the second channel. An input port connected to the first channel directs the fluid containing the entrained particles into the first channel. An output port connected to the first channel directs the large particles out of the first channel. A port connected to the second channel directs the small particles out of the second channel.

The particle separator system is designated generally by the reference numeral 100. The particle separator system 100 includes shallow parallel channels 104, 105, and 106 that are etched in a silicon wafer 101. Fluid enters the particle separator system 100 through input port 102 and exits from the system 100 through output port 103. The fluid can be any type of fluid; however, in the system 100 being described for this embodiment, the fluid is a liquid carrying entrained particles of a target size and particles smaller than the target size.

Four identical separation sections are included in particle separator system 100. The system on the left side will be described in greater detail. Fluid carrying entrained particles of a target size and particles smaller than the target size travels from input port 102 through the channel 104 and enters particle collection channel 105. On both sides of the particle collection channel 105 are waste collection channels 106. A precision particle gap connects the particle collection channel 105 and the waste collection channels 106. The precision particle gap extends between the particle collection channel 105 and the adjacent collection channels and runs the length of the waste collection channel 105. This precision particle gap is sized during the fabrication process to trap all particles over a desired target size. The precision particle gap will be illustrated further in additional figures. The waste collection channels 106 are connected to waste ports 107. The particle collection channels 105 are connected to output port 103.

Figure 2:
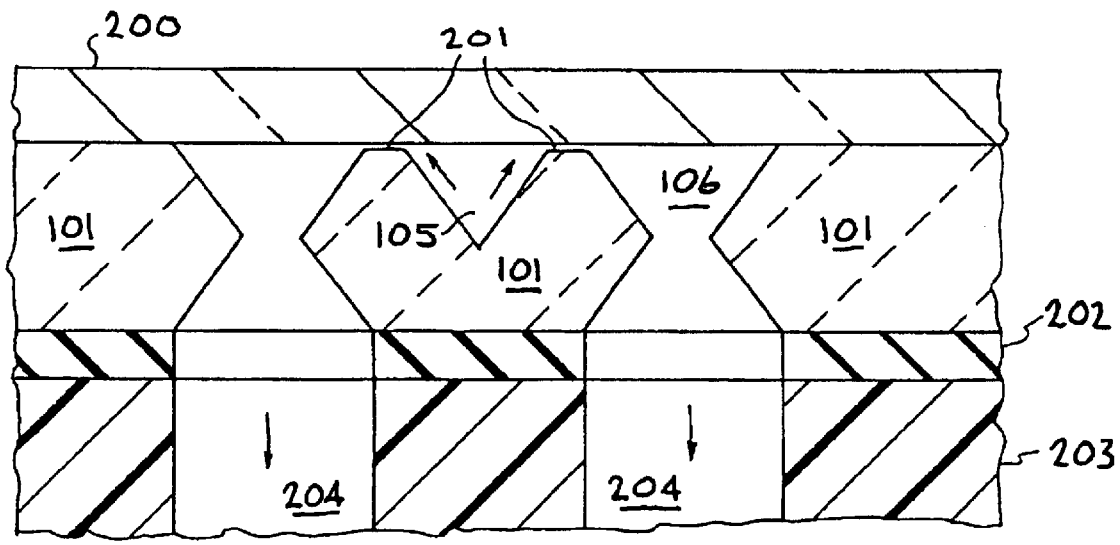
FIG. 2 shows greater details of a portion of the system shown in FIG. 1.

Referring now to FIG. 2, additional details of one of the four identical separation sections of the system 100 are shown. Waste collection channels 106 are located on both sides of the particle collection channel 105. A precision particle gap 201 connects the particle collection channel 105 and the waste collection channels 106. A glass plate 200 is positioned over the silicon wafer 101 and doses the top of the particle collection channel 105, the waste collection channels 106, and the precision particle gap 201. The precision particle gap 201 will be illustrated in greater detail in FIG. 3. The waste collection channels 106 are connected to waste ports 107. The silicon wafer 101 is positioned on a base 203 that can be made of Teflon, plastic, or other material. The waste ports 107 are connected to waste channels 204 in the base 203. Gaskets 202 are positioned to provide a fluid tight seal between waste ports 107 and waste channels 204.

Figure 3:
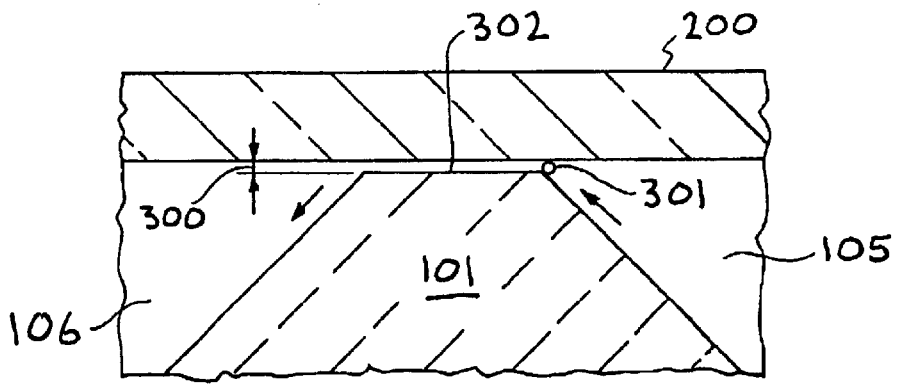
FIG. 3 shows greater details of a portion of the system shown in FIG. 2.

Referring now to FIG. 3, details are shown of the precision particle gap 300 between the particle collection channel 105 and the adjacent waste collection channels 106. The precision gap 300 runs the length of the particle collection channel 105. The precision gap 300 is formed by controlling the distance between the glass plate 200 and the surface 302 of the area between the particle collection channel 105 and the adjacent waste collection channel 106.

The structural details of one embodiment of a particle separator system constructed in accordance with the present invention having been described, the operation of the system 100 will now be described. Trapping is accomplished by flowing the sample fluid in through the input port 102 through the precision gap 300 and out through waste collection channels 106 and their associated ports 107. During this step, the output port is closed causing all flow of the fluid to pass through the precision gap 300. In this embodiment the fluid is a liquid carrying entrained particles of a target size and particles smaller than the target size. The target particles do not pass through the precision gap 300 and the target particles are collected in the particle collection channel 105. Once the trapping is complete another fluid is be flowed through the particle collection channel 105 from the input port 102 with the output port 301 opened thereby carrying the trapped target particles out of the system 100.

The method of producing the particle separator system 100 will now be described. The particle separator system separates particles entrained in a fluid. Some of the particles are of a small size, smaller than a predetermined size, and some of the particles are of a large size, larger than said predetermined size. A first channel and a second channel are etched in a base. A precision gap is etched in the base connecting the first channel and the second channel. The precision gap is etched to a size that allows the small particles to pass from the first channel into the second channel and prevents the large particles from passing from the first channel into the second channel. A cover is positioned over the base unit, the first channel, the precision gap, and the second channel. An input port is connected to the first channel for directing the fluid containing the entrained particles into the first channel. An output port is connected to the first channel for directing the large particles out of the first channel. A port is connected to the second channel for directing the small particles out of the second channel.

The silicon base portion of the system 100 shown in FIGS. 1, 2, and 3 is fabricated using photolithography and anisotropic etching. The channels are created using photolithography and isotropic etching. The first step in the device fabrication is to pattern and mask the silicon wafer 101 and do a shallow etch in the areas where the precision gap 300 will be located. The depth of this etch is determined by the size of the particle to be trapped. The etch depth is slightly less then the diameter of the particles to be trapped. Once this step is completed the mask is removed and the wafer is masked and patterned on both the front and back sides. The wafer is then etched from both sides creating the deeper channels 105 and 106. The glass 200 is anodically bonded to the silicon wafer 101 forming a sealed fluidic device.

The system 100 is a sandwiched structure of silicon 101 and glass 200. The precision gap 300 that traps the particles is made by doing a timed etch in the silicon layer. This etch is accomplished by wet silicon processing in solutions such as KOH or by a dry etching technique. The silicon wafer 101 has a masking material such as silicon nitride that is patterned using photolithography so that only areas where the gap is needed is etched. The gap is then created when the glass layer is bonded to the silicon wafer. Using this technique, extremely precise gaps can be made. After the etch is completed for the gap the wafer is then masked again and re-patterned to make the rest of the structure etched to create the parallel channels that collect the particles and collect the waste part of the sample. The bonded glass layer also has etched channels that overlap with the particle collection channels.

Figure 4:
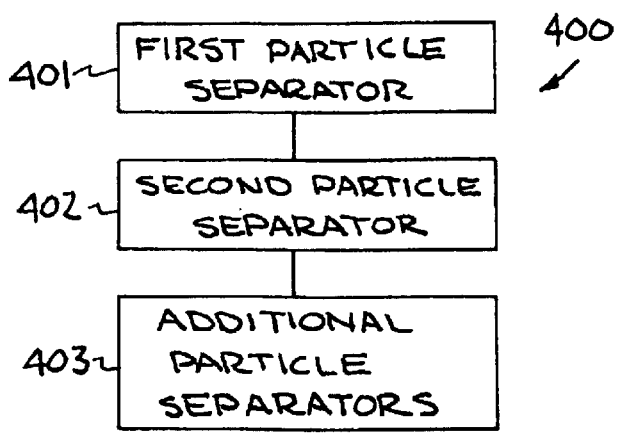
FIG. 4 shows another embodiment of a particle separator system constructed in accordance with the present invention.

Referring now to FIG. 4, another embodiment of a particle separator system constructed in accordance with the present invention is shown. This embodiment of a particle separator system is designated generally by the reference numeral 400. The system 400 provides a system for separating particles by size. A first particle separator unit 401 is shown. The particle separator unit 401 is substantially identical to the particle separator 100 shown in FIG. 1. Trapping is accomplished by flowing the sample fluid in through the input port through the precision gap and out through waste collection channels and their associated ports. During this step, the output port is closed causing all flow of the fluid to pass through the precision gap. The fluid is a liquid carrying entrained particles. The larger particles do not pass through the precision gap and are collected in the particle collection channels. Once the trapping is complete another fluid is be flowed through the particle collection channel from the input port with the output port opened thereby carrying the trapped particles out of unit 401 into unit 402.

The particle separator unit 402 is basically the same as the particle separator unit 401; however, in particle separator unit 402 the particles of interest are collected in the waste collection ports instead of the output port. The trapped particles coming from unit 401 into unit 402 are all larger than a certain size because the smaller particles passed through the precision particle gap and were directed to the waste port. The precision gap in particle separator unit 402 is fabricated to be slightly larger than the precision gap in particle separator unit 401. In particle separator unit 402 the particles of interest are small enough to pass through the precision gap and are separated from larger particles that are trapped in the center collection channels. Additional units 403 allow for further separation of particles according to size. The particle separator system 400 is therefore able to separate particles by size by controlling the precision gaps in the various units.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus for separating particles entrained in a fluid, some of said particles being of a small size, smaller than a predetermined size, and some of said particles being of a large size, larger than said predetermined size, comprising:

a base, a first channel in said base, a second channel in said base spaced from and substantially parallel to said first channel, a precision gap connecting said first channel and said second channel, said precision gap being selected to allow said small size particles to pass from said first channel into said second channel and preventing said large size particles from passing from said first channel into said second channel, a cover positioned over said base, said first channel, said precision gap, and said second channel, an input port connected to said first channel, an output port connected to said first channel, and a port connected to said second channel.

2. The apparatus for separating particles entrained in a fluid of claim 1 wherein said base is a silicon wafer.

3. The apparatus for separating particles entrained in a fluid of claim 1 wherein said cover is a glass plate.

4. The apparatus for separating particles entrained in a fluid of claim 1 wherein said first channel and said a second channel are substantially the same length and wherein said precision gap extends between said first channel and said second channel along said length.

5. The apparatus for separating particles entrained in a fluid of claim 1 wherein said base is a silicon wafer and said first channel and said second channel are etched channels.

6. The apparatus for separating particles entrained in a fluid of claim 5 wherein said precision gap is an etched precision gap.

7. A method of producing a particle separator for separating particles entrained in a fluid, some of said particles being of a small size, smaller than a predetermined size, and some of said particles being of a large size, larger than said predetermined size, comprising the steps of:

providing a base, etching a first channel in said base, etching a second channel in said base spaced from and substantially parallel to said first channel, etching a precision gap in said base connecting said first channel and said second channel, said precision gap being etched of a size to allow said small size particles to pass from said first channel into said second channel and preventing said large size particles from passing from said first channel into said second channel, positioning a cover over said base, said first channel, said precision gap, and said second channel, providing an input port connected to said first channel for directing said fluid containing said entrained particles into said first channel, providing an output port connected to said first channel for directing said large size particles out of said first channel, and providing a port connected to said second channel for directing said small size particles out of said second channel.

8. The method for separating particles entrained in a fluid of claim 7 wherein said step of providing a base comprises providing a silicon wafer base.

9. The method for separating particles entrained in a fluid of claim 7 wherein said step of positioning a cover over said base, said first channel, said precision gap, and said second channel, comprises positioning a glass plate cover over said base, said first channel, said precision gap, and said second channel.

10. The method for separating particles entrained in a fluid of claim 7 wherein said first channel and said a second channel are etched so that they are substantially the same length and wherein said precision gap is etched so that it extends between said first channel and said second channel along said length.

11. The method for separating particles entrained in a fluid of claim 7 wherein said steps of etching said first channel, said second channel, and said precision gap are accomplished by wet silicon etching process.

12. The method for separating particles entrained in a fluid of claim 7 wherein said steps of etching said first channel, said second channel, and said precision gap are accomplished by dry etching process.

13. The method for separating particles entrained in a fluid of claim 7 wherein said steps of etching said first channel, said second channel, and said precision gap are accomplished by timed etching.

14. The method for separating particles entrained in a fluid of claim 7 wherein said step of positioning a cover over said base unit is accomplished by anodically bonding said cover to said base unit.

* * * * *